March 28, 1944.    G. LACKEY    2,345,269
CLAMP
Filed April 7, 1941
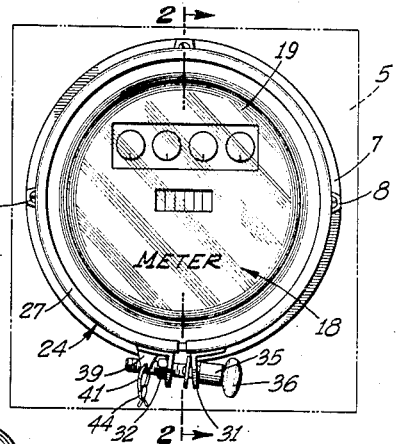
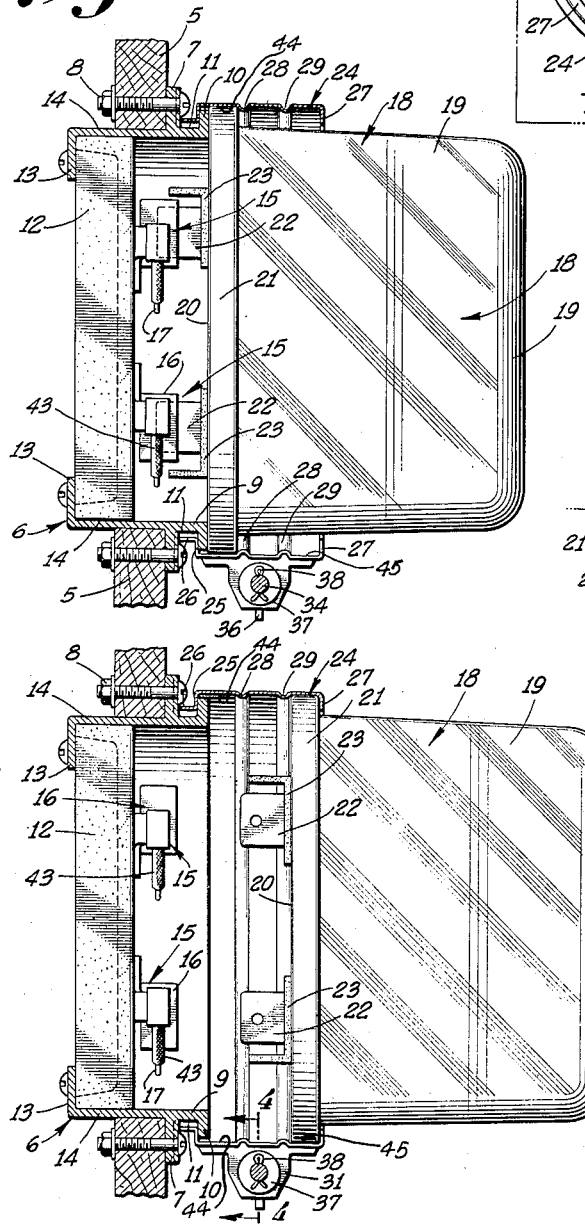
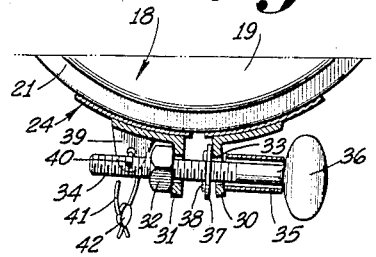
George Lackey
INVENTOR
BY Joseph F. Westall
ATTORNEY Patented Mar. 28, 1944

2,345,269

UNITED STATES PATENT OFFICE 2,345,269

CLAMP

George Lackey, Whittier, Calif.

Application April 7, 1941, Serial No. 387,200

14 Claims. (Cl. 175—223)

This invention relates to clamps, and more specifically contemplates apparatus for retaining electric meters of the character commonly employed by utility companies to measure and record electricity used by particular equipment or by individual consumers either in or out of contact, selectively with the power lines and the installation of the equipment serviced, for controlling the circuit to such equipment.

In order to properly record and charge customers for electricity used and for which they have assumed liability, it is necessary that the installations of each customer be provided with a separate meter. The customer may, of course, indicate at any time his intention to terminate his liability for electricity supplied to a particular installation, in which case the electricity must either be turned off, or the company takes the risk of unauthorized use of electricity incident to continued operation of the equipment under conditions making it extremely difficult and ordinarily impractical to fix liability for electricity supplied. It is costly however with present equipment for the company to break the circuit with every change of ownership or possession of the premises serviced. Accordingly it is not unusual for a company to assume losses occasioned by supplying electricity to premises between the termination of liability of one tenant and the assumption of liability by the new tenant.

Meters commonly in use enclose mechanism by which contact is made between the source of electricity and the particular installation. Accordingly service may be dis-continued by removing the meter and covering the terminals. This requires however, that the meter be returned to the company, and as the meters are generally registered to the premises at which they were initially installed, they must be kept available and properly identified to enable prompt re-installation when desired. Moreover, in such cases it is necessary to re-test the meter before again installing it on the premises.

It is an object of the present invention to provide clamping mechanism for attaching a meter of conventional construction to a mounting for the support of the meter either in a position closing contact between the power lines and the equipment to be serviced, or, selectively in a different position with the circuit open, the clamp being adapted to be sealed in the usual manner with the meter in either position, thus overcoming difficulties above mentioned when service is interrupted, by permitting the meter with all auxiliary apparatus to remain on the premises at all times.

Another object is to provide a clamp of the character referred to, requiring neither special tools nor skilled manipulation for its operation in re-adjusting the position of the meter, and which is completely self-contained no additional mechanism being required to retain the meter in position either in or out of contact with the power terminals.

Another object is to provide a clamp adapted to be sealed with the meter in either position and to present substantially the same appearance when the meter is out of contact with the terminals as when in operation, so as to avoid any indication to consumers not familiar with the construction how the dis-connection was effected or how it might be reconnected.

Other objects and salient features of my invention such, for example, as economy of manufacture, simplicity of construction, ease of operation, protection of the meter and connecting elements against inclement weather, and adaptability for durable and positive support of the meter at all times, will be apparent to those skilled in the art to which my invention appertains from an examination of the following description read in the light of the accompanying drawing, in which:

Fig. 1 is a front elevation of a meter secured, as in use, to a suitable mounting by the clamp of my invention;

Fig. 2 is an enlarged sectional view of the clamp and of the supporting structure with which it is used, taken on lines 2—2 of Fig. 1, showing in elevation the meter as positioned for use;

Fig. 3 is a sectional view, similar to Fig. 2, but illustrating the clamp holding the meter out of contact with both the power supply line terminals and the contacts of the wires leading to the electrical equipment to be serviced;

Fig. 4 is a sectional view of the means for controlling the operation of the clamp, and of the sealing device therefor.

Referring to the drawing in detail the numerals of which indicate similar parts throughout the several views, 5 designates the wall of a building or the like adjacent the point of attachment of power supply lines directed to a particular consumer location. A conventional form or circular mounting 6 is arranged in an opening in the wall with an integral annular flange 7 abutting the outer surface thereof. The mounting 6 is secured in the wall opening by bolts 8 extending through and equi-spaced around flange 7. A hub 9 forming a part of mounting 6, projects from wall 5 and is formed with a retaining flange 10 at its outer edge, thus providing a peripheral groove 11 intermediate flanges 7 and 10. The upper and lower ends of each of a pair of terminal blocks 12, vertically arranged, and composed of Bakelite or other electrically non-conducting material are secured in spaced relation by suitable means to depending and upstanding lugs 13 of pairs of retaining members 14 projecting rearwardly. A pair of terminals 15, each comprising abutting spring clips 16, are attached to each block 12 in spaced relation. To accommodate the common form of meter the upper terminals 15 of each block are connected to the power lines 17 and the lower clips are connected to the local installation to be serviced.

The meter 18 illustrated is of the well known type with its mechanism (not shown) enclosed in a glass case 19. An open end of the case 19 is sealed by a circular plate 20 of a diameter slightly greater than the case so as to form a circumferential rim 21 at one end. The meter mechanism is adapted to be connected in the electrical circuit by knife contacts 22 extending through plate 20 and spaced apart for insertion into and engagement by the clips 16 of the respective terminals 15 carried by the mounting when rim 21 of meter 18 is arranged in abutting relationship with retaining flange 10 of the mounting. 23 indicates a guide overhanging each contact 22 to assist in aligning the contacts with clips 16.

The clamp of my invention by which the meter may be secured to the mounting comprises a substantially circular split rim 24 having an inwardly extending annular lip 25 at one edge adapted to engage behind the retaining flange 10 of hub 9. A circular extension 26 of lip 25, parallel to the axis of rim 24 contacts the inner flange 7 of the mounting, by which the latter is secured to the wall when the clamp is in operative association with the mounting. At the opposite edge of the rim a second inwardly-extending integral lip 27 similar in shape to lip 25, is provided for a purpose about to be described.

The inner surface of split rim 24 is interupted by a pair of beads 28 and 29 pressed from the rim intermediate its side edges. The bead 28 is adapted to cooperate with lip 25 and flange 10 of the mounting to form a channel 44, and is spaced from said lip far enough to accommodate in said channel the flange 10 and annular rim 21 of casing 19. The bead 29 similarly cooperates with the outer lip 27 for reception by the channel 45 formed therebetween of the rim 21 of the casing and is spaced from the lip 27 sufficiently for this purpose.

Adjacent each of the ends of rim 24, formed by the split, a radially extending ear 30 and 31 is secured by rivets, welding or the like. A nut 32 is secured to the back of one of the ears 31 with an opening 33 therein registering with an opening of the opposite ear 30, through which openings a wing-headed screw 34 is adapted to extend for threaded engagement with nut 32. A sleeve 35 encircles the shank of screw 34 between its head 36 and ear 30 to space the head from rim 24 to facilitate operation. 37 indicates a washer encircling the screw at the opposite side of ear 30 from sleeve 35 and is retained against said ear by a cotter key 38 to spread the ends of rim 24 apart upon threading the screw 34 out of nut 32. The threaded end of screw 34 passes between a pair of perforated sealing members 39, integral with and disposed rearwardly of ear 31, depending from the rim. Screw 34 is formed with a hole 40 extending diametrically therethrough adjacent its end. After adjusting the clamp, a wire 41 is passed through the perforation in one member 39, through the hole 40 in screw 34 and thence through the perforation of the opposite member 39, and the ends of the wire are then sealed in a common form of lead seal 42, thus preventing readjustment of the screw or displacement of the clamp without breaking seal 42 or wire 41.

The use and operation of my invention is briefly described as follows: After a prospective customer has contracted for electricity at a particular location lead wires 17 from the power lines are connected to upper terminals 15 of a mounting 6 installed at the premises. Wires 43, leading to the equipment to be serviced are connected to the lower terminals 15. The clamp of my invention with rim 24 spread apart by screw 34 and washer 37 is placed over flange 10 of mounting 6, and meter 18 is then inserted into the clamp with rim 21 of the meter in abutting relationship with the flange 10. In such position the knife contacts 22 of the meter will have been inserted into the clips 16 of the respective terminals of the mounting so as to provide for completion of the circuit through the equipment to be serviced. The clamp is then tightened by threading screw 34 into the nut 32 so as to engage the lip 26 of the clamp behind the flange and bead 28 of rim 24 behind the opposite side of the rim 21 of the meter, thus preventing displacement of the meter with respect to the mounting. Screw 34 is then sealed as above described.

If a customer indicates his intention to terminate his liability for the use of electricity supplied to the equipment through the meter, a company service man may break the circuit with a minimum of time and effort. The seal first is broken and the clamp spread apart by manipulation of the screw as above indicated, whereupon the meter is manually shifted outwardly from the wall to disengage the knife contacts from the terminal 15 to a position aligning the rim 21 of the meter 18 with the area within the rim between the outer bead 29 and lip 27. The clamp is then once more tightened on mounting 6 and meter 18 to secure the meter in a newly-adjusted position. The screw is then sealed in the manner described.

The meter, clamp and associated parts present substantially the same appearance with the meter in either position in the clamp, the only difference being that the glass case 19 extends from the wall 5 slightly farther when the meter is out of contact with terminal 15. Accordingly there is no indication from the exterior appearance of the apparatus to one not very familiar with the structure how or where the break in the circuit is made or how it might be remedied, thus discouraging any tampering with the device.

It will also be observed that while the means by which the clamp is operated is illustrated as located below the meter where it ordinarily will be disposed in use, the clamp may be rotated to locate screw 34 at any position on the circumference of the meter for most facile adjustment and manipulation in use.

While I have described but one embodiment of my invention it will be understood that numerous changes in size, design, number and proportion of the parts may be made, that any means adapted for securing the rim of the meter and the flange of the mounting in, selectively, abutting or spaced relationships may be substituted for that shown, that other conventional means for tightening the rim on the mounting and meter may be employed, and that extension 26 of lip 25 may be omitted if desired—all without departing from the scope of my invention as defined by the appended claims.

What I claim and desire to secure by Letters Patent is:

1. In a clamp for a device having a peripheral flange, a rim, and two pairs of retaining elements associated with the rim and restricting the bore thereof for the selective engagement of the flange of the device to be clamped.

2. In a clamp for a device having a projecting circular flange, a rim adapted to encircle the flange of the device to be clamped, means within said rim to engage said flange to restrict relative axial movement of the clamp and device engaged thereby, and separate means spaced from said last named means to similarly engage said flange of the device with which the clamp is used to hold the device in a different position from that in which the device is held when the latter is engaged by said first-named means, said means elements being adapted for selective utility.

3. In a clamp, a rim, a series of retaining elements projecting into the bore of the rim defining between different pairs thereof separate spaced areas for selective disposition of the device to be engaged by the clamp for holding the device in either of two different positions.

4. In a clamp, a rim having an inwardly projecting lip, a retaining element carried by the rim and extending into the bore thereof, said lip restricting the bore of the rim to a greater extent than the retaining element.

5. In a clamp, a rim carrying an inwardly extending lip, a pair of retaining elements carried by and restricting the bore of the rim, the unrestricted opening through the portion of the rim in which the lip is disposed being of lesser circumference than the bore of the rim as restricted by the retaining elements.

6. In a clamp, a split rim having an inwardly extending annular lip at each substantially circular edge thereof, and a bead on the inner surface of the rim to form a pair of annular channels on the inner surface of the rim between the bead and the lips, respectively.

7. In a clamp, a split rim having an inwardly extending annular lip at each substantially circular edge thereof, a bead on the inner surface of the rim to form a pair of annular channels on the inner surface of the rim between the bead and the lips, respectively, and means to secure the ends of the rim against relative movement.

8. In a clamp, a split rim having an inwardly extending annular lip at each substantially circular edge thereof, a bead on the inner surface of the rim to form a pair of annular channels on the inner surface of the rim between the bead and the lips, respectively, and means to move the ends of the rim toward and away from one another.

9. In a clamp, a split rim having an inwardly extending annular lip at each substantially circular edge thereof, and a bead on the inner surface of the rim to form a pair of spaced annular channels on the inner surface of the rim between the bead and said lips, respectively.

10. In a clamp for attaching to a mounting a device having an engageable outer surface, a rim to substantially encircle a portion of said device and said mounting for attachment to the latter, and a pair of retainers associated with said rim for selective engagement with said surface of said device to retain the latter in either of two positions with respect to said mounting.

11. In a clamp for attaching to a mounting a device having an engageable surface, a rim having means associated therewith for connecting the rim to the mounting, separate retainers within the rim adapted for selective engagement with said engageable surface of the device for holding the latter in either of two positions varying in proximity to the mounting, and means for selectively actuating said retainers while maintaining the connection between said rim and mounting.

12. In a clamp for attaching a device having an electrical contact element and an engageable surface, to a mounting having an electric contact element, a rim for partially encircling said engageable surface of said device and said mounting, means connecting said rim to the mounting, a first retaining element associated with said rim engageable with said engageable surface to hold said contacts together, and a second retaining element associated with said rim engageable with said surface of the device to hold the latter to said mounting with said contacts separated, said first and second retaining elements being operable, selectively.

13. In a clamp for attaching a device having an electric contact element and an engageable surface, to a mounting having an electric contact element, a rim for partially encircling said engageable surface of said device and said mounting, means connecting said rim to the mounting, a first retaining element associated with said rim engageable with said engageable surface to hold said contacts together, a second retaining element associated with said rim engageable with said surface of the device to hold the latter to said mounting with said contacts separated, and means for selectively actuating said retaining elements while maintaining the connection between said rim and mounting.

14. In a clamp for attaching a device having an electric contact element and an engageable surface, to a mounting having an electric contact element, a rim for partially encircling said engageable surface of said device and said mounting, means connecting said rim to the mounting, a first retaining element associated with said rim engageable with said engageable surface to hold said contacts together, a second retaining element associated with said rim engageable with said surface of the device to hold the latter to said mounting with said contacts separated, and means for selectively actuating said retainers while limiting the degree of movement between said device and said mounting.

GEORGE LACKEY.